United States Patent [19]
Fischl et al.

[11] Patent Number: 5,520,775
[45] Date of Patent: May 28, 1996

[54] ENERGY DIRECTOR FOR ULTRASONIC WELD JOINT

[75] Inventors: Steven R. Fischl, Coral Springs; Micheal M. Austin, Pompano Beach, both of Fla.

[73] Assignee: Motorola, Inc., Schaumburg, Ill.

[21] Appl. No.: 454,891

[22] Filed: May 31, 1995

Related U.S. Application Data

[63] Continuation of Ser. No. 201,953, Feb. 25, 1994, abandoned.

[51] Int. Cl.⁶ ..................................................... B32B 31/16
[52] U.S. Cl. ................... 156/580.1; 156/73.1; 425/174.2
[58] Field of Search ........................ 156/73.1, 92, 580.1, 156/580.2; 264/23, 442; 425/174.2; 428/99; 403/265, 270, 375, 376, 381, 404

[56] References Cited

U.S. PATENT DOCUMENTS

| | | | |
|---|---|---|---|
| 3,602,257 | 8/1971 | Berleyoung et al. | 156/73.1 X |
| 4,169,751 | 10/1979 | Yen | 156/73.1 |
| 4,417,933 | 11/1983 | Bernat | 156/73.1 X |
| 4,685,368 | 8/1987 | Gardner | 403/381 X |
| 4,795,511 | 1/1989 | Wouters et al. | 156/73.1 |
| 5,011,555 | 4/1991 | Sager | 156/73.1 |
| 5,238,717 | 8/1993 | Boylan | 428/35.7 |

FOREIGN PATENT DOCUMENTS

| | | | |
|---|---|---|---|
| 93103114 | 2/1993 | European Pat. Off. | |
| 1014935 | 1/1986 | Japan | 156/73.1 |

Primary Examiner—David A. Simmons
Assistant Examiner—J. Sells
Attorney, Agent, or Firm—Kenneth M. Massaroni

[57] ABSTRACT

A multi-faceted energy director (15) is provided for joining two plastic workpieces (12) (14) by an ultrasonic welding method. The energy directors (15) include at least first and second facets (16) (17) arranged in perpendicular fashion, so as to engage two surfaces. A method for joining at least two ultrathin plastic pieces, including the multifaceted energy director, is also provided.

13 Claims, 3 Drawing Sheets

ENERGY DIRECTOR FOR ULTRASONIC WELD JOINT

This is a Continuation of U.S. Ser. No. 08/201,953 filed on Feb. 25, 1994, abandoned, and assigned to Motorola, Inc.

TECHNICAL FIELD

This invention relates in general to the field of ultrasonic welding, and particularly to energy directors employed in the ultrasonic welding process.

BACKGROUND

The demand for small, light weight consumer products has increased substantially in recent years. This demand for smaller, lighter weight products has forced manufacturers of these products to employ ultrathin, ultralight materials in, for example, the plastic housing of those products. These ultrathin plastic housings often have thicknesses on the order of between 0.20 and 0.50 millimeters.

These thin plastic housings are low weight, and often rely upon the structure of the item being housed for structural integrity and/or stability. However, they pose several challenges in the manufacturing arena, and particularly, in joining two or more such plastic pieces. Typically, ultrathin plastic parts must be bonded together with adhesives because standard ultrasonic welding techniques are not feasible.

Traditionally, thick plastic parts have been joined ultrasonically by aligning the parts, and initiating the weld along an energy director formed into one of the parts. The nature of the bond between the parts so joined is tensile, that is, resists the tendency of forces to tear it apart. Manufacturers have typically strengthened these types of ultrasonic welds by either increasing the weld depth, or increasing the size of the energy director, thus providing a larger weld area. However, adopting this approach with ultrathin plastic components results in numerous problems. For example, increased weld depth and/or energy director size also increases the likelihood of burning through one or more of the plastic parts, thus rendering the part unusable. Deep welds also cause "flash" or seepage of the weld from between the welded components. Welds which completely melt one or both of the parts degrade the plastic, causing concentrated stresses of the weld joint. These stresses result in weaker bonds, and also in a tendency for parts so joined to come apart upon, for example, impact.

Another problem associated with ultrasonically joining plastic parts arises from the tendency of plastic parts to become mis-aligned during the welding process. More particularly, the ultrasonic welding process is often a substantially manual procedure, whereby two or more plastic parts are brought into contact with one another and must be held so, as by the application of pressure to the two parts, until the weld is completed. The result is mis-formed parts which are at least cosmetically unacceptable, and at worst lacking in structural integrity.

Accordingly, there exists a need for a method of ultrasonically welding the parts, particularly ultrathin plastic parts, which provides for enhanced weld strength, and improved part alignment.

SUMMARY OF THE INVENTION

Briefly, according to the invention, there is provided an energy director for effecting an ultrasonic weld between a first and a second plastic workpiece. The energy director extends from the surface of at least one of said plastic workpieces, and has at least a first and a second elongated terminal portion. The first elongated terminal portion extends from the surface of the workpiece in substantially the same direction as the energy director. The second elongated terminal portion extends in a direction substantially perpendicular to that of the first elongated terminal portion. Both elongated terminal portions are formed as substantially pointed portions. The second elongated terminal portion may be further adapted to snap into, and engage a recess formed in said second plastic workpiece, so as to hold the first and second workpieces in mated relationship for the application of an ultrasonic welding energy source. This "snap assembly" reduces the likelihood of mis-alignment between the work pieces.

The energy director may further include a third elongated terminal portion extending therefrom. Specifically, a third elongated portion will be arranged in a direction substantially perpendicular to that of the first elongated terminal portion, and extending in a direction opposite to that of the second elongated terminal portion. An energy director so configured may be adapted to engage a cavity formed in the second workpiece.

Further according to the invention, there is provided a housing for enclosing an electronic component, such as a battery pack. The housing includes first and second housing covers, each housing cover including a housing base. The first housing cover further includes housing sidewalls extending perpendicularly from the housing base. At the distal end of the sidewall is formed an energy director. The energy director may include at least first and second elongated terminal portions. The first and second elongated terminal portions are arranged in substantially perpendicular relationship to one another. If a third elongated terminal portion is provided, it is arranged to point in a direction opposite said second energy director. The first elongated terminal portion engages the housing base of the other housing cover, and the second and/or third elongated terminal portion engage a recess or cavity in said second housing cover.

Further, according to the invention, there is provided a method for joining at least a first and second plastic workpiece via ultrasonic welding. The method comprises the steps of providing a first and second workpiece, at least one workpiece having formed therein an energy director having at least first and second elongated terminal portions. The elongated terminal portions are formed as raised ribs, or ridges, and are formed in substantially perpendicular relationship to one another. The method comprises the further step of providing a second workpiece with at least first and second surfaces arranged in perpendicular fashion. Thereafter the first and second workpieces are brought into contact with one another so that the first elongated portion engages the first surface of said second workpiece, while said second elongated portion engages the second surface of said second workpiece. Thereafter, a source of ultrasonic welding energy is applied to said workpieces so as to melt said first and second elongated terminal portions and into a homogenous mass.

DETAILED DESCRIPTION OF THE PREFERRED EMBODIMENT

Figure 1:
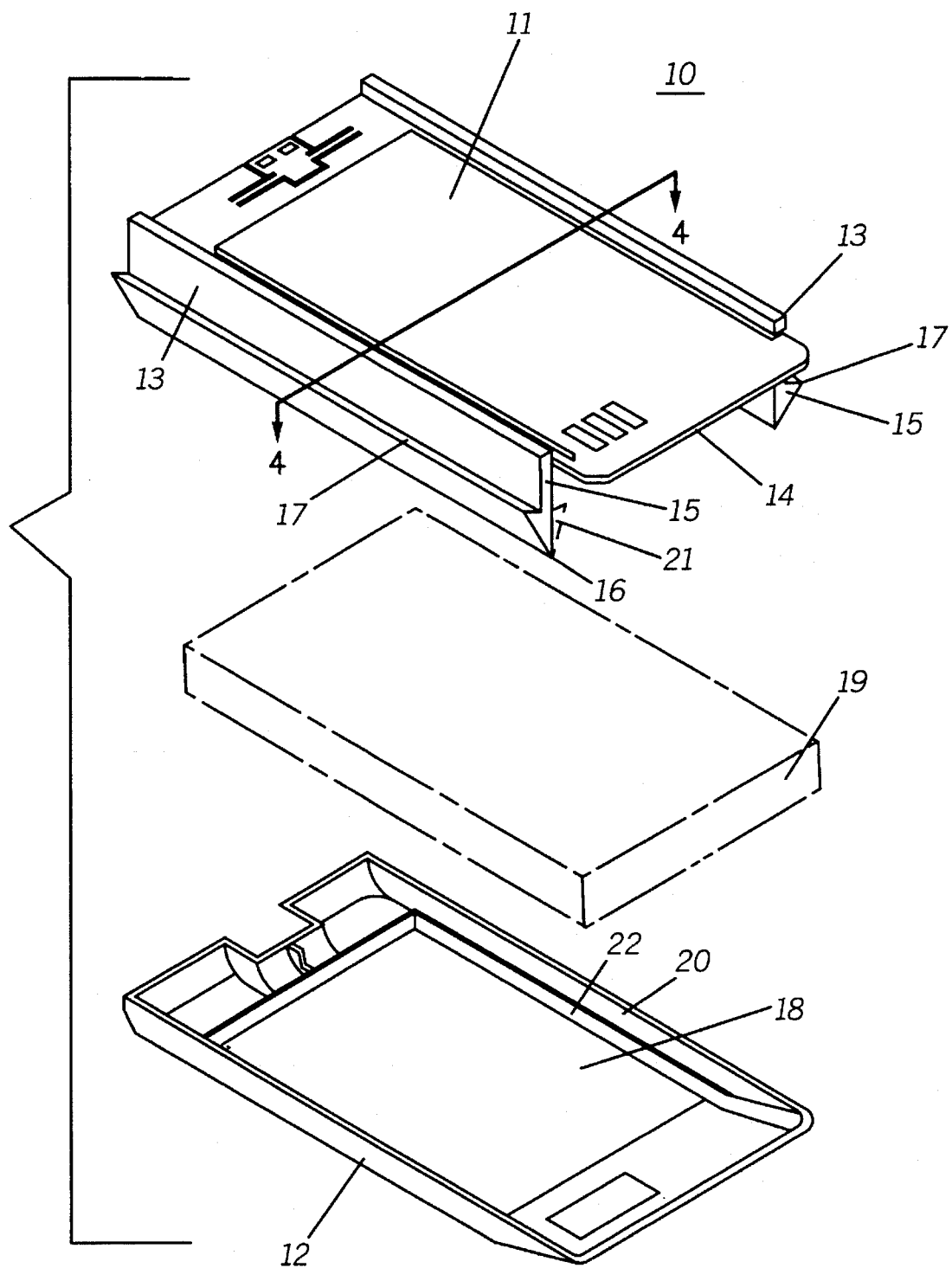
FIG. 1 is an exploded perspective view of a plastic housing including energy directors in accordance with the invention.

While the specification concludes with claims defining the features of the invention that are regarded as novel, it is believed that the invention will be better understood from a consideration of the following description in conjunction with the drawing figures, in which like reference numerals are carried forward.

Referring now to FIG. 1, there is illustrated therein an expoded perspective view of a plastic housing 10 including energy directors in accordance with the instant invention. The housing 10 comprises a first housing cover 12 and a second housing cover 14. The housing 10 illustrated in FIG. 1 is adapted to house an electronic component, such as a battery cell 19 (in phantom) for use in, for example, a portable telephone. However, it is to be understood that the invention is not so limited, in that the invention may be advantageously employed in joining any two plastic members, for any application. The first housing cover 12 and the second housing cover 14 are typically fabricated of a thermo-plastic material such as, but not limited to a polycarbonate. The thickness of the thermo-plastic material is typically between approximately 0.20 and 0.50 millimeters. Accordingly, deep ultrasonic welds are not possible, as they will burn through the first and second housing covers 12 and 14 respectively.

The second housing cover 14 includes a housing base 11, and housing walls 13 extending perpendicularly from the housing base 11. At the distal end of said housing walls 13 is disposed an energy director 15. The energy director 15 has at least a first elongated terminal portion 16 extending from the housing base in the same direction as the housing walls 13. The energy director 15 further includes a second elongated terminal portion 17 extending from the energy director 15 in a direction perpendicular to the first elongated terminal portion 16. In an alternative embodiment illustrated in FIGS. 3 and 5, the energy director 15 includes a third elongated terminal portion 21 in phantom.

The first housing base 12 includes a first housing base 18 and housing side walls 20 extending perpendicularly from said housing base 18. The side walls 20 may further include a recess 22, adapted to engage terminal end portions 17 of energy director 15. In the alternative embodiment of FIG. 3 and FIG. 5, an energy director having three elongated portions may be engaged by a cavity formed in housing cover 12. It may be appreciated that first housing cover 12 is larger than the second housing cover 14, and second housing cover 14 is adapted to fit into first housing cover 12. However, the invention is not so limited.

Figure 2:
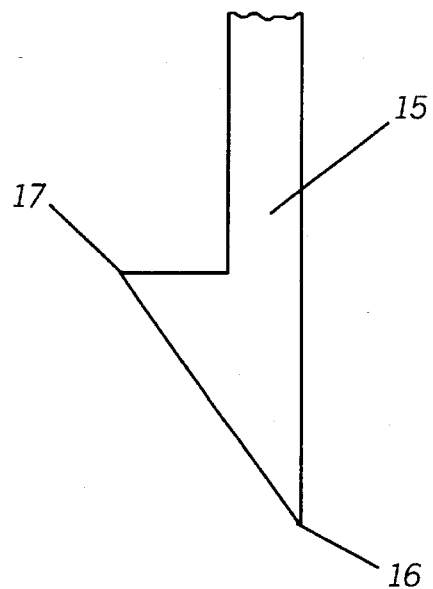
FIG. 2 is a plan view of an energy director in accordance with the invention.

Referring now to FIG. 2, there is illustrated therein a plan view of the energy director 15 of housing cover 14. Energy director 15 includes a first elongated terminal portion 16 which terminates in a ridge, or pointed end. The energy director 15 further includes a second elongated terminal portion 17 disposed perpendicularly to the first elongated terminal portion 16. Second elongated terminal portion 17 may also terminate in a ridge or pointed end.

Figure 3:
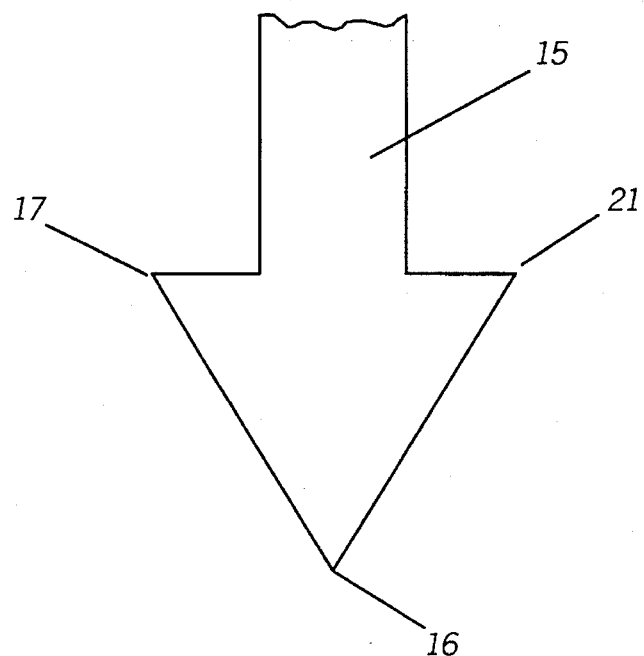
FIG. 3 is a plan view of an alternative embodiment of an energy director in accordance with the invention.

Referring now to FIG. 3, there is illustrated therein an alternative embodiment of the energy director 15. The energy director of FIG. 3 includes a first elongated terminal portion 16, and a second elongated portion 17 as described hereinabove with respect to FIG. 2. The energy director of FIG. 3 further includes a third elongated terminal portion 21 disposed perpendicularly to first elongated terminal portion 16, and arranged so as to point in a direction opposite to second elongated terminal portion 17. The third elongated terminal portion may also terminate in a ridge or pointed end.

As noted hereinabove, a single energy director results in an ultrasonic weld occurring between the energy director and the second part to be bonded, in the region where the energy director contacts the second part. The nature of this bond is tensile, that is, resistive to forces tending to tear it apart. Conversely, in accordance with the instant invention, an energy director having first and second terminal portions 16 and 17 respectively illustrated in FIG. 2, (or a third portion 21 of FIG. 3) allows for a first ultrasonic weld to occur at the interface between the first elongated portion 16 and the base 18 of the first housing 12, and a second ultrasonic bond to occur at the interface between the second elongated portion 17 and the side wall 20 at side wall recess 22 of the first housing cover 18. Alternately, in the embodiment of FIG. 3, second and third elongated portions 17 and 21 form ultrasonic welds with, for example, a cavity in the base 18 of the first housing cover. In this way, the ultrasonic weld between the first and second housing cover are substantially strengthened since a second (or third) weld is introduced, and since the nature of these welds is to resist shear forces.

Figure 4:
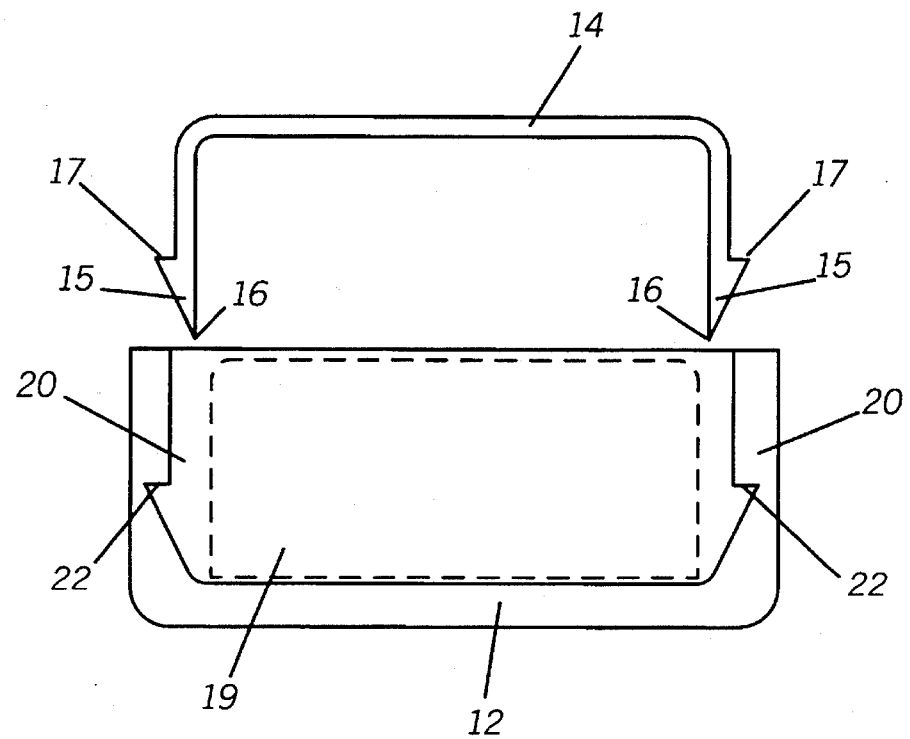
FIG. 4 is a sideview of a housing, taken along line 4—4 of FIG. 1.
Figure 5:
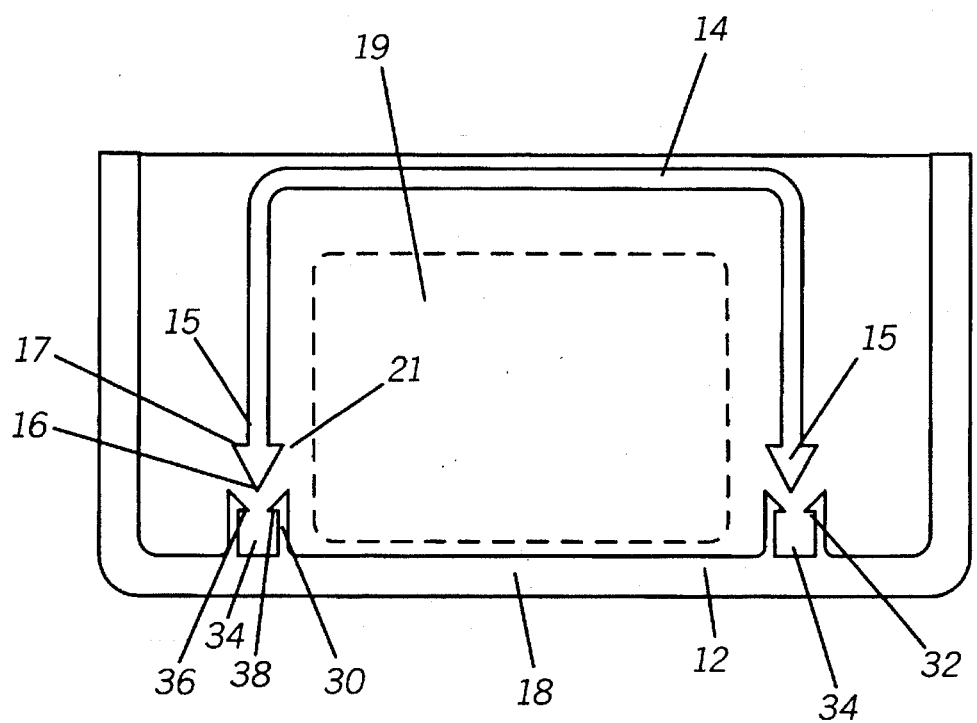
FIG. 5 is a sideview of a housing, taken along line 4—4 of FIG. 1, illustrating an alternative embodiment of an energy director in accordance with the invention.

Further, and as will be appreciated from a perusal of FIG. 4, and FIG. 5, the recess 22 or a cavity allows the second elongated portion 17 to snap into, and engage the housing cover. Accordingly, it is possible to manually fit the first and second housing covers 12 and 14 respectively without the need for continuous pressure urging them together. This will reduce misalignment between the first and second parts in the welding process, reducing scrap or otherwise unacceptable welds.

Referring now to FIG. 4, there is illustrated a cross-sectional view taken along line 4—4 of FIG. 1, and illustrating the first and second housing covers 12 and 14. The energy directors 15 are configured as illustrated in FIG. 2, with the second elongated terminal portions 17 engaging recess 22 in the side walls 20 of first housing cover 12. The joining process is completed by urging first and second housing covers into contact so that second elongated portion 17 is engaged in recess 22. Ultrasonic welding is accomplished by the application of welding energy, such as a welding horn to the energy director 15. The thermo-plastic material from which the housings are fabricated is melted, achieving a weld in the regions of elongated portions 16 and 17.

Referring now to FIG. 5, there is illustrated a cross-sectional view of a housing as in FIG. 1, but illustrating the alternative embodiment of FIG. 3 in accordance with the invention. Base 18 of housing cover 12 has two pairs of ridges 30 and 32 formed therein. Each pair of ridges 30 and 32 defining a cavity 34 and 36 formed therein. The energy directors 15 on housing cover 14 include at least three elongated terminal portions 16, 17 and 21 as illustrated in FIG. 3. The cavities 34 and 36 are sized so as to accommodate, and engage energy directors 15. The ridges are configured further to include recesses 36 and 38 for engaging the second and third elongated terminal portions 17 and 21 of the energy director 15. These recesses form a "snap assembly" which allows the first and second covers to remain substantially engaged before ultrasonic welding, hence reducing misalignment. Further, the ridges 30 and 32, and the cavities 34 and 36 are configured so that the outer edges of the cavities are slightly flexible. Accordingly, as the energy directors are inserted into the cavities 34 and 36, the edges of the ridges deflect slightly so as to engage the energy directors. Thereafter, ultrasonic welding is accomplished by the application of welding energy, such as a welding horn, to the energy directors 15. The thermo-plastic material from which the housings and energy directors are fabricated is melted, achieving a weld in the regions of elongated terminal portions 16, 17 and 21.

While the preferred embodiments of the invention have been illustrated and described, it will be clear that the invention is not so limited. Numerous modifications, changes, variations, substitutions, and equivalents will occur to those skilled in the art without parting from the spirit and scope of the present invention as defined by the appended claims.

What is claimed is:

1. A housing for enclosing at least one component, said housing comprising:

a first housing cover having a housing base, and means for engaging an ultrasonic energy director; and a second housing cover having a housing base, and an ultrasonic energy director extending perpendicularly from said base, said energy director having at least two elongated terminal portions, said first terminal portion extending in a direction perpendicular to said base and when ultrasonically joined to said first housing cover, providing a tensile bond thereto, and said second elongated portion extending in a direction perpendicular to said first elongated portion, and when ultrasonically joined to said first housing cover, providing a bond resistant to shear forces.

2. A housing as defined in claim 1, wherein said means for engaging include sidewalls extending perpendicularly from said first cover base, said sidewalls having a recess formed therein, said recess adapted to engage the second elongated terminal portion of said energy director.

3. A housing as defined in claim 1, wherein said second housing cover is adapted to fit into said first housing cover.

4. A housing as defined in claim 2, wherein said first elongated terminal portion is adapted to ultrasonically join the first housing base, and said second elongated terminal portion is adapted to ultrasonically join said first housing sidewalls.

5. A housing as defined in claim 1, wherein said component is a battery.

6. A housing as defined in claim 1, wherein said energy director further includes a third elongated terminal portion extending substantially perpendicularly to said first elongated terminal portion, and in a direction opposite to said second elongated terminal portion.

7. A housing as in claim 6, wherein the means for engaging the energy director comprises a cavity formed in said second housing cover.

8. An energy director for effecting an ultrasonic weld between at least a first and a second plastic workpiece, said energy director extending from the surface of said first plastic workpiece, said energy director having a first elongated terminal portion extending from said workpiece in the same direction as said energy director said first elongated terminal portion, when ultrasonically joined to said second workpiece, providing a tensile bond, and a second elongated terminal portion extending substantially perpendicularly to said first elongated terminal portion said second elongated terminal portion, when ultrasonically joined to said second workpiece, providing a bond resistant to shear forces.

9. An energy director as defined in claim 8, wherein said second elongated terminal portion is further adapted to engage said second plastic workpiece.

10. An energy director as defined in claim 9, wherein said second plastic piece has a recess formed therein for engaging said second elongated terminal portion.

11. An energy director as defined in claim 8, wherein said first and second elongated terminal portions are pointed.

12. An energy director as defined in claim 8, further including a third elongated terminal portion, said third elongated terminal portion extending substantially perpendicularly to said first elongated terminal portion, and in a direction opposite said second elongated terminal portion.

13. An energy director as defined in claim 12, wherein said energy director is adapted to engage a cavity formed in said second workpiece.

* * * * *